United States Patent [19]

Heilmayr et al.

[11] Patent Number: 4,967,800
[45] Date of Patent: Nov. 6, 1990

[54] SECONDARY CONFINEMENT PIPE HAVING SEGMENTS WITH INTERLOCKING RIB AND GROOVE JOINTS AND COEXTRUDED SEALANT LAYERS #4

[75] Inventors: Peter Heilmayr, McPherson; Kenton Gearhart, Moundridge, both of Kans.

[73] Assignee: American Maplan Corporation, McPherson, Kans.

[21] Appl. No.: 300,951

[22] Filed: Jan. 23, 1989

[51] Int. Cl.$^5$ ............................................. F16L 9/22
[52] U.S. Cl. ................................ 138/162; 138/157; 138/128; 138/166
[58] Field of Search ............... 138/157, 162, 156, 128, 138/163, 166, 151; 428/192

[56] References Cited

U.S. PATENT DOCUMENTS

| | | | |
|---|---|---|---|
| 1,197,140 | 9/1916 | Mathews | 138/157 |
| 1,329,522 | 2/1920 | Griffin | 138/157 |
| 3,682,434 | 8/1972 | Boenig | 138/162 |
| 4,325,414 | 4/1982 | Schaefer | 138/162 |
| 4,388,488 | 6/1983 | Wlcek et al. | 138/166 |
| 4,576,846 | 3/1986 | Noel | 138/162 |
| 4,667,505 | 5/1987 | Sharp . | |

FOREIGN PATENT DOCUMENTS

| | | | |
|---|---|---|---|
| 74402 | 7/1970 | Fed. Rep. of Germany | 138/162 |
| 7200 | 3/1902 | United Kingdom | 138/157 |
| 2883 | 8/1915 | United Kingdom | 138/157 |

OTHER PUBLICATIONS

Brochure issued by Failsafe Containment Systems Inc., describing and illustrating double walled pipeline.

Primary Examiner—James E. Bryant, III
Attorney, Agent, or Firm—Herbert Dubno

[57] ABSTRACT

A secondary confinement pipe is assembled from identical segments of extruded polyvinylchloride with tenon and groove formations along longitudinal edges enabling the segments to be interfitted. The joints are sealed by flexible synthetic resin coextruded with one of the formations at respective edges.

20 Claims, 3 Drawing Sheets

SECONDARY CONFINEMENT PIPE HAVING SEGMENTS WITH INTERLOCKING RIB AND GROOVE JOINTS AND COEXTRUDED SEALANT LAYERS #4

FIELD OF THE INVENTION

My present invention relates to a secondary confinement pipe and, more particularly, to a pipe which can be assembled around an elongated member which requires additional confinement and which is composed of extruded polyvinylchloride.

BACKGROUND OF THE INVENTION

It is frequently required to enclose an elongated structure in a housing or confinement duct, for example to be able to monitor possible leakage from a pipe in highly sensitive operations where such leakage which may result in environmental contamination or the development of a dangerous situation.

For example, a pipe carrying a radioactive material may be surrounded by a secondary confinement pipe so that any products leaking into the space between the primary conduit and the secondary pipe may be detected by sensors provided in such space.

Alternatively, it may be advantageous to monitor leakage from the environment into a protected space around an elongated member such as an electrical conductor.

In still another application of a secondary confinement pipe, a primary conduit carrying a gas may be surrounded by the secondary confinement pipe so that any leakage of gas into the space around the primary conduit can be detected.

In all such cases, it is advantageous to utilize a relatively rigid secondary confinement pipe structure.

While ordinary rigid polyvinylchloride pipe can be utilized for this purpose when the primary conduit or elongated member can be fed through the secondary confinement pipe, in many cases it is necessary to assemble the secondary confinement pipe around the preexisting primary conduit or elongated member. Accordingly, snap-together constructions have been provided in which parts of the secondary confinement pipe can be interfitted around the primary conduit to fully enclose the latter. One of the problems with such secondary confinements is that of sealing of the joints between the interfitting parts of the secondary confinement pipe.

Customarily separate sealing members or packings were required for this purpose. Such sealing arrangements were not economical and, in many cases, did not function efficiently. While the problem could be solved by forcing a sealant into gaps at the joints, in practice this is a time-consuming operation and depends on the precision of the workmanship for effective sealing.

OBJECTS OF THE INVENTION

It is the principal object of the present invention to provide a secondary confinement pipe for the above applications as examples, whereby drawbacks of earlier confinement systems are avoided.

Another object of my invention is to provide a secondary confinement system which allows the parts of the secondary confinement pipe to be fabricated simply and economically and yet ensures a perfect seal at the joints between the parts when they are assembled around the primary conduit or another elongated member to be received in the secondary confinement.

SUMMARY OF THE INVENTION

These objects and others which will become apparent hereinafter are attained, in accordance with the present invention, with a secondary confinement pipe in which the pipe is assembled from a plurality of identical members having mating joint-forming formations at their contiguously longitudinal adjoining edges and which are coextruded with a layer of soft or flexible synthetic resin at at least one of these formations so that the flexible material forming the sealant is coextruded with the rigid polyvinylchloride forming the balance of the pipe segment.

A secondary confinement pipe adapted to surround a primary conduit, therefore, comprises a plurality of identical elongated pipe segments assimilable to form a containment pipe around a primary conduit, each of the segments having a pair of longitudinal edges, one of the longitudinal edges of each segment being formed unitarily with a tenon rib receivable in a groove formed in the other longitudinal edge of a contiguously adjoining segment, and a layer of a flexible material surrounding each of the ribs and filling the respective groove around the respective rib, the segments each being composed of extruded rigid polyvinylchloride coextruded with and bonded to the respective one of the layers.

Advantageously each of these ribs has a head extending along a free edge of the rib and enclosed in a respective one of the flexible layers coextruded with the rigid PVC so that each layer is coextruded with and bonded to the respective rib. Of course it is possible to coextrude the flexible layer so that it will line the groove and is shaped to receive the respective head.

Advantageously, moreover, each of the layers has the outer configuration of a circular section bead and each of the grooves is of a cross section complementary to that of the bead.

The heads can have arrow-shaped sections and each of the layers can extend all around the respective rib onto shoulders of the respective edge provided with the rib, where the shoulders flank the rib.

Preferably the layers are composed of flexible polyvinylchloride and the confinement pipe is composed of two such identical segments each of which is substantially semicylindrical.

The segments of the confinement pipe may be snapped together by pressing the ribs with which the flexible material is coextruded into the grooves of the edge of the other segment or by inserting the ribs longitudinally into grooves where space is available.

According to another aspect of the invention, the layer of soft or flexible synthetic resin can be provided at two surfaces of one of the members juxtaposed with surfaces of the other member straddling the mating joint-forming rib. In one embodiment of the invention, the flexible synthetic resin can be in the form of strips which are generally flat. Alternatively or in addition, the flexible material can be provided on the opposite flanks of the rib in relatively narrow beads.

In yet a further embodiment of the invention, the material is provided in strips which are held on the member with which the flexible material is coextruded by a groove joint filled with this material during the coextrusion process.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 2:
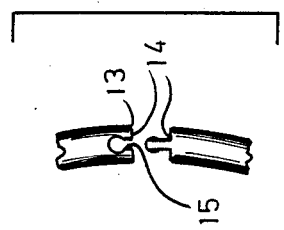
FIG. 2 is a view drawn to the same scale as FIG. I showing the members forming the joints in a separated condition.
Figure 1:
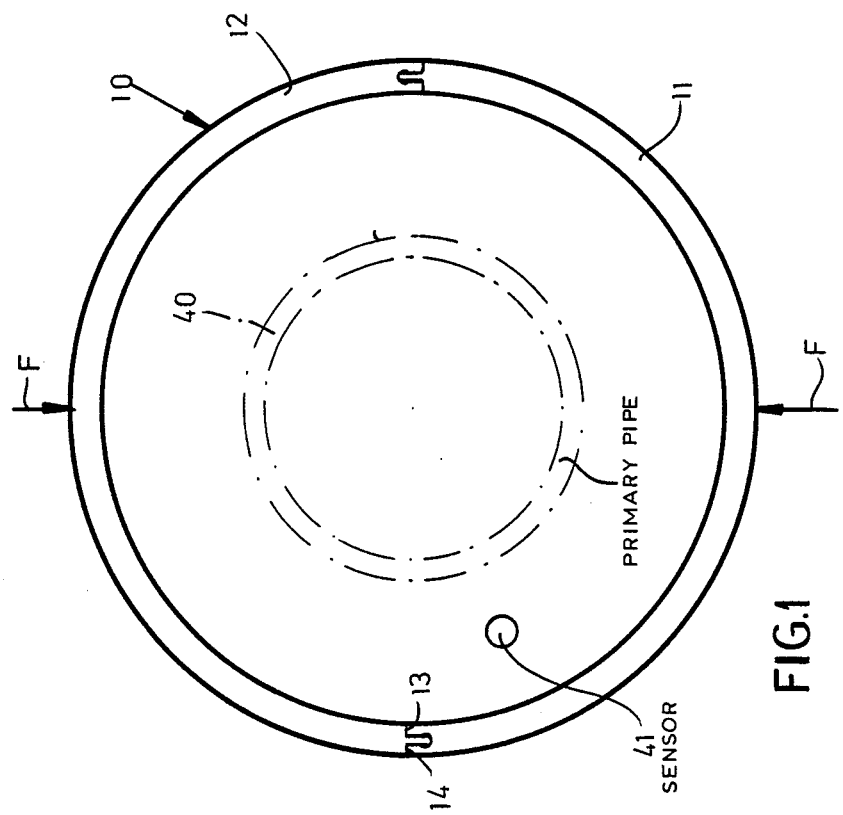
FIG. 1 is an end view of a confinement pipe and diagrammatically illustrates the principles of the present invention.
Figure 3:
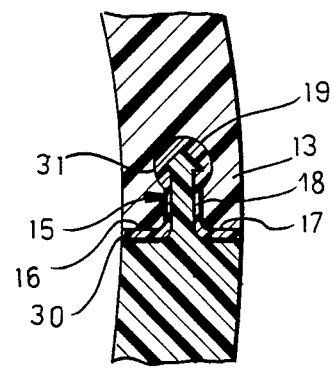
FIG. 3 is a cross sectional view drawn to a larger scale of the assembled joint.
Figure 5:
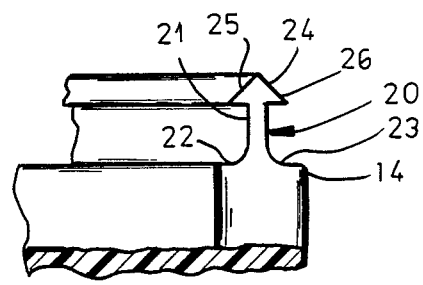
FIG. 5 is a detail perspective view of a portion of the rib with the coextruded flexible layer having been removed.
Figure 4:
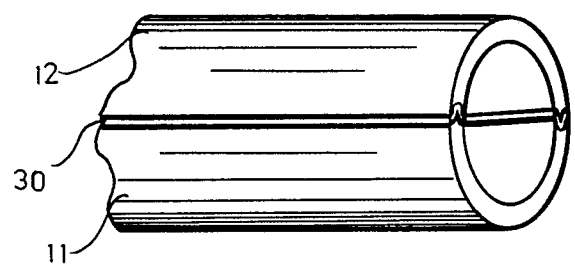
FIG. 4 is a perspective view of a portion of the assembled pipe.

The confinement pipe 10 illustrated in FIG. 1 comprises two identical extruded segments 11 and 12 which have longitudinal edges 13 and 14, respectively formed with mating mortise and tenon formations better seen in the remaining Figures. Opposite longitudinal edges of the two segments have such mating formations so that when two identical extruded pipe segments 11 and 12 are relatively rotated through 180 with respect to one another, they can be snap-fitted by the application of a radial force as represented by the arrows F in FIG. 1.

The edge 13 is formed with a groove 15 extending inwardly from a pair of shoulders 16 and 17 which flank the slot-shaped mouth 18 of the groove. The slot-shaped mouth 18 opens into a circular-section enlargement 19.

The edge 14 on the other side of the pipe segment is provided with a rib 20 which has an arrow-shaped cross section with a web 21 projecting from a pair of shoulders 22, 23 and terminating in a triangular section head 24 which forms a pair of barbs 25 and 26 or ledges resisting separation of the rib 20 from a layer 30 of flexible polyvinylchloride material coextruded with the rigid PVC of the ribs.

The layer 30 completely encloses the rib and extends along the web 21 and onto the shoulders 22 and 23, being bonded to the rib and the pipe segment by virtue of the coextrusion process by which the pipe segment is formed.

The layer 30 defines a circular-section bead 31 around the head 24 which is exactly complementary to the enlargement 19 of the groove so that when this bead is driven into the groove in assembling the confinement pipe, the joint will be completely filled by the layer 30 on the respective rib.

The confinement pipe can be assembled around a primary pipe or conduit 40 and the space between the primary pipe or conduit and the confinement pipe can be provided with sensors, one of which is shown diagrammatically at 41, for example, to monitor leakage from the primary conduit.

Figure 6:
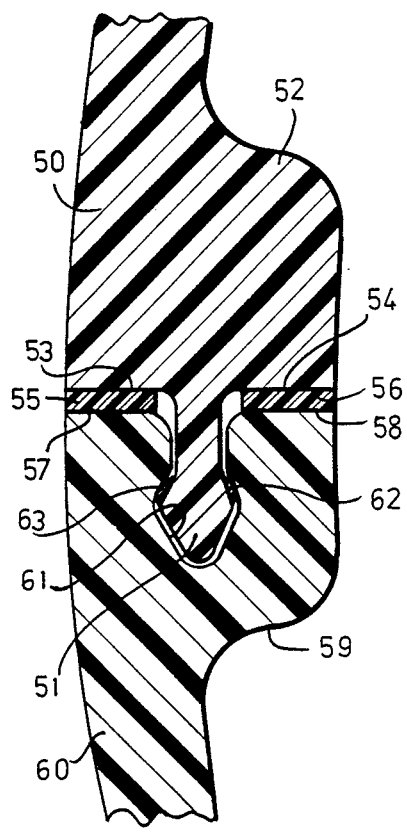
FIG. 6 is a cross sectional view similar to FIG. 3 illustrating another embodiment of the invention.

In the embodiment of FIG. 6, the flexible material does not encase the rib as is the case with the embodiments previously described. In this arrangement, the member 50 provided with the rib 51 may have an enlarged edge portion 52 from which the rib 51 projects beyond a pair of surfaces 53 and 54 flanking the rib 51. On each of these surfaces 53 and 54, a respective strip 55 or 56 of the soft material may be coextruded to sealingly engage the surfaces 57 and 58, respectively, of the enlarged edge portion 59 of the other member 60. The enlarged edge portion here has a groove 61, complementary to and receiving the arrow section rib 51 in the manner described. It has been found to be advantageous to provide, in addition to the sealing strips 55 and 56, a pair of beads 62 and 63 of the soft synthetic resin coextruded with the confinement pipe member on the flanks of the head of the rib 51 as shown. Of course, sealing strips may be provided only on the rib if desired.

Figure 7:
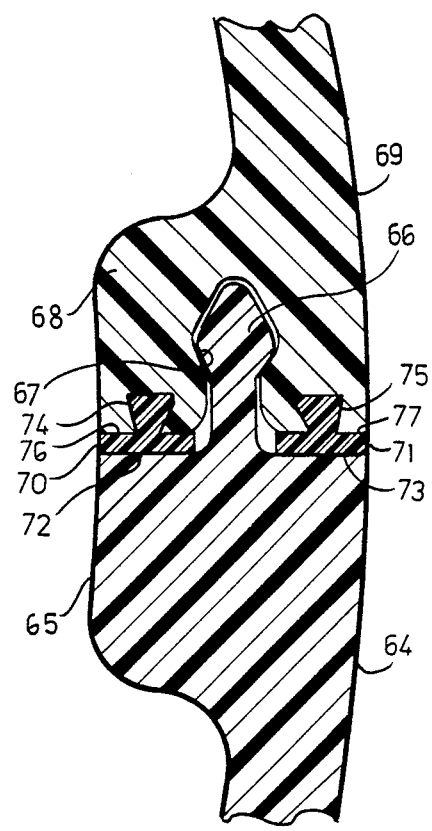
FIG. 7 is a view similar to FIG. 6 of an embodiment in which the flexible coextruded sealant is received in grooves flanking the groove which constitutes the mating formation accommodating the rib.

In FIG. 7, we have shown another embodiment which utilizes principles similar to that of FIG. 6. In this embodiment, the member 64 provided with the enlarged edge portion 65 is formed with the rib 66 which engages in a groove 67 in the enlarged edge portion 68 of the other member 69. The sealing strips 70 and 71 bear against the surfaces 72 and 73 of member 64 flanking the rib 66 but are coextruded with member 69 and fill dovetail grooves 74 and 75 recessed in the surfaces 76 and 77 of the enlarged edge portion 68. The principle of operation of the sealing strips in FIGS. 6 and 7 is, of course, identical to the sealing principle previously described.

The coextrusion may utilize the principles described in one or more of the commonly-owned copending applications: patent application Ser. No. 07/237,211 filed Aug. 26, 1988 (now U.S. Pat. No. 4,856,975 issued Aug. 15, 1989), patent application Ser. No. 07/261,909 filed Oct. 24, 1988 (now U.S. Pat. No. 4,867,689 issued Sept. 19, 1989) and, patent application Ser. No. 07/278,044 filed Nov. 30, 1988 (now U.S. Pat. No. 4,874,306 filed Oct. 17, 1989) or in the literature referred to therein.

We claim:

1. A secondary confinement pipe adapted to surround a primary conduit, comprising a plurality of identical elongated pipe segments assemblage to form a containment pipe around a primary conduit, each of said segments having a pair of longitudinal edges, one of the longitudinal edges of each segment being formed unitarily with a tenon rib receivable in a groove formed in the other longitudinal edge of a contiguously adjoining segment, and a layer of a flexible material surrounding each of said ribs and filling the respective groove around the respective rib, said segments each being composed of extruded rigid polyvinylchloride coextruded with and bonded to the respective one of said layers.

2. The secondary confinement pipe defined in claim 1 wherein each of said ribs has a head extending along a free edge of the rib and enclosed in the respective layer, and each of said layers is coextruded with and bonded to the respective rib.

3. The secondary confinement pipe defined in claim 2 wherein each of said layers has an outer configuration of a circular-section bead and each of said grooves has a configuration complementary to that of said bead.

4. The secondary confinement pipe defined in claim 2 wherein each of said heads is of arrow-shaped cross section.

5. The secondary confinement pipe defined in claim 2 wherein each of said layers extends all around the respective rib onto shoulders of the respective one of said edges flanking the respective rib.

6. The secondary confinement pipe defined in claim 2 wherein said layers are composed of flexible polyvinylchloride.

7. The secondary confinement pipe defined in claim 1 wherein the pipe is composed of two of said segments, each of said segments being substantially semicylindrical.

8. The secondary confinement pipe defined in claim 7 wherein each of said ribs has a head extending along a free edge of the rib and enclosed in the respective layer, and each of said layers is coextruded with and bonded to the respective rib.

9. The secondary confinement pipe defined in claim 8 wherein each of said layers has an outer configuration of a circular-section bead and each of said grooves has a configuration complementary to that of said bead.

10. The secondary confinement pipe defined in claim 9 wherein each of said heads is of arrow-shaped cross section.

11. The secondary confinement pipe defined in claim 10 wherein each of said layers extends all around the respective rib onto shoulders of the respective one of said edges flanking the respective rib.

12. The secondary confinement pipe defined in claim 11 wherein said layers are composed of flexible polyvinylchloride.

13. A secondary confinement pipe adapted to surround a primary conduit, comprising a plurality of identical elongated pipe segments assemblage to form a containment pipe around a primary conduit, each of said segments having a pair of longitudinal edges adapted to confront edges of at least one other of said pipe segments, one of the longitudinal edges of each pair being formed unitarily with a tenon rib, receivable in a groove formed in the other longitudinal edge of the pair of a contiguously adjoining segment, and respective layers of flexible material flanking each of said ribs and received between edges of contiguously adjoining segments to seal a joint formed by engagement of the respective rib in the respective groove, said segments each being composed of extruded rigid polyvinylchloride, said layers being coextruded with and bonded to the extruded rigid polyvinylchloride of at least one of the segments at each of said joints.

14. The secondary confinement pipe defined in claim 13 Wherein said edges of said segments are enlarged to provide a pair of surfaces flanking the respective rib and the respective groove at each of said joints, said layers being received between the said surfaces of contiguously adjoining segments.

15. The secondary confinement pipe defined in claim 14, further comprising additional beads of said flexible material coextruded with and bonded to opposite flanks of said ribs.

16. The secondary confinement pipe defined in claim 13 wherein said layers are coextruded with and formed on opposite flanks of said ribs.

17. The secondary confinement pipe defined in claim 14 wherein said layers are received in grooves formed in the said surfaces of one of the segments at each of said joints.

18. The secondary confinement pipe defined in claim 17 wherein the last-mentioned grooves are of dovetail cross section.

19. The secondary confinement pipe defined in claim 13 wherein said layers are composed of flexible polyvinylchloride.

20. The secondary confinement pipe defined in claim 13 wherein said ribs have an arrowhead cross section.

* * * * *